United States Patent
Desarzens et al.

(12)

(10) Patent No.: US 6,326,411 B1
(45) Date of Patent: Dec. 4, 2001

(54) MIXTURE FOR THE MANUFACTURE OF AN EXPANDED CELLULAR POLYMER PRODUCT AND MANUFACTURING PROCESS UTILIZING SUCH A MIXTURE

(75) Inventors: Philippe Desarzens, Blonay; Eric Affolter, Lully, both of (CH)

(73) Assignee: Nextrom Holding SA (CH)

( * ) Notice: Subject to any disclaimer, the term of this patent is extended or adjusted under 35 U.S.C. 154(b) by 0 days.

(21) Appl. No.: 09/356,450

(22) Filed: Jul. 19, 1999

(30) Foreign Application Priority Data

Aug. 14, 1998 (EP) .................................. 98810783

(51) Int. Cl.7 ........................................ C08J 9/04
(52) U.S. Cl. .................. 521/91; 521/79; 521/142
(58) Field of Search ................. 521/142, 79, 91

(56) References Cited

U.S. PATENT DOCUMENTS

| 3,344,215 | 9/1967 | Witz et al. . | |
|---|---|---|---|
| 4,407,768 | 10/1983 | Garcia et al. . | |
| 4,451,633 | * 5/1984 | Brownscombe et al. | 521/119 |
| 4,506,037 | 3/1985 | Suzuki et al. . | |
| 4,616,042 | * 10/1986 | Avakian | 521/79 |

\* cited by examiner

*Primary Examiner*—John M. Cooney, Jr.
(74) *Attorney, Agent, or Firm*—Oliff & Berridge, PLC

(57) ABSTRACT

The mixture comprising a polymer, an adsorbtion agent including an expansion agent and a nucleating agent is produced before being placed in an extruder. The result is a finished product of expanded cellular polymer comprising more than 90% by volume of closed cells.

19 Claims, No Drawings

MIXTURE FOR THE MANUFACTURE OF AN EXPANDED CELLULAR POLYMER PRODUCT AND MANUFACTURING PROCESS UTILIZING SUCH A MIXTURE

The present invention relates to a mixture for the manufacture of a cellular polymer product comprising more than 90% by volume of closed cells, and to a manufacturing process utilizing said mixture for obtaining said product.

For numerous applications, particularly for hot water pipes or the pipes of a district heating installation, it is sought to obtain insulation for the pipes having the lowest possible thermal conductivity. For this purpose, the pipes may be covered with an insulating layer of cellular material, preferably an expanded polymer.

By means of polymer extrusion technology, cellular structure materials of very variable apparent densities can be producted.

For obtaining relatively low expansion rates, so called "chemical" blowing agents are ordinarly used, which are organic or inorganic compounds capable of generating gaseous by-products by thermal decomposition or by any other chemical reaction capable of being triggered in the extruder or later on by heating the product in an oven.

For obtaining high rates of expansion, the technology most frequently has recourse to the injection of gases or liquids having a low boiling point (so-called "physical" blowing agents) which can be injected in sufficient quantity into the mass of molten polymer kept under high pressure in the extruder. In this case, the process usually requires the use of high-pressure metering pumps or compressors which are a major technological complication and add to the cost of the installation.

U.S. Pat. No. 3,344,215 discloses a process using injection of a volatile liquid foaming agent into the plastic mass of the polymer, in an extruder.

According to U.S. Pat. No. 4,407,768, a composition is provided which is able to feed an extruder. The composition contains hydrated alumina as filler precursor, which loses its water of hydration upon heating.

A further development of this technology is taught by U.S. Pat. No. 4,506,037, where water is used as an expansion agent. The aqueous medium is treated together with the other ingredients for producing a resin compound as the result of a melt-adhesion process. After a complex compounding operation the resin compound is able to feed an extruder.

To insure a cellular structure which is uniform, all the ingredients used must be mixed in the most homogeneous possible manner, particularly the nucleating agent, and there must be no significant temperature deviation within the mass of polymer at the time of formation of the cellular structure, despite the fact that this mass must be cooled before leaving the extruder. For at that time, its temperature must be as close as possible to the solidification temperature of the polymer. For these various reasons, the recourse has most often been sophisticated to equipment, calling for twin-screw extruders or two extruders in cascade.

In a first aspect, the present invention is a mixture for manufacturing an expanded cellular product including more than 90% by volume of closed cells, comprising a basic polymer in the form of powder or fine granules, a liquid expansion agent, an adsorbing agent capable of adsorbing the liquid expansion agent and a nucleating agent.

The preparation of mixtures comprising all the necessary ingredients for effecting the expansion at the outlet of the extruder is an improvement with respect to the processes necessitating injection of an expansion agent in a particular region of an extruder. However, the last-mentioned reference still requires sophisticated equipment for effecting the "melt-adhesion" step of the process.

Research undertaken by the Applicant has shown that a mixture as stated hereabove, prepared in a very simple manner by a proper choice of the ingredients, unexpectedly leads to a drastic reduction in the cost of production of well-aimed expanded cellular products having a very high rate of expansion.

Thus the present invention, according to its first aspect, is a mixture with the essential characteristics defined in claim 1, while the claims depending therefrom define its secondary characteristics.

A second aspect of this invention is a process utilizing the mixture of claim 1, said process being defined by claim 10, while the claims depending therefrom define particular features of the process.

The product is produced by extrusion of a mixture containing the polymer and the necessary ingredients about a tube or any other article of similar shape or by extrusion directly in the form of a section. The cellular structure is produced continuously immediately at the outlet of the extruder, within the die or at the outlet thereof. This cellular structure thus makes it possible to reduce the specific gravity of the product greatly and to lessen its thermal conductivity significantly.

The present invention contributes a number of technological simplifications inasmuch as all the ingredients necessary for obtaining the cellular structure product are mixed mechanically at ambient pressure and temperature before being placed in the extruder. Furthermore, the choice of ingredients is such that the phase of homogenizing the mixture in the extruder is simplified thereby and that despite the presence of one or more liquids, the mixture of ingredients flows without difficulty and without any tendency to agglomerate and can therefore be metered easily in the extruder as is usually done with pellets. Moreover, the process requires the use of only one single-screw extruder.

The extruder is fed with a mixture containing the polymer or polymers, as well as all the ingredients necessary for the process. In the extruder, the volumetric metering, melting, pressurizing of the mixture and homogenizing thereof (materials and temperature) are carried out. The extruder is provided with an extrusion head for shaping the product, as well as for creating a cellular structure such as described above. As a variation, it allows the co-extrusion of an outer layer having no cellular structure. Calibrating and cooling of the product are carried out according to the rules of the art normally applied for the products concerned (tubes, sections, and the like).

The following list describes the main and secondary characteristics, as well as the possible variations of the mixture according to the invention and of the process according to the invention.

(a) The basic polymer is preferably a polymer of the polyolefin group or a mixture of several polymers of that group.

(b) The basic polymer, in whole or in major part, is preferably in the form of a powder or of very fine granules. If necessary, the mixture may contain up to 20% of polymer pellets of ordinary size (e.g., 2.5 mm in diameter, 3 mm in length).

(c) The cells are formed by the vaporization and expansion of a liquid, or of a mixture of several low boiling-point liquids. Such liquids are called expansion agents. Among the liquids usable for this purpose are the low boiling-point alcohols, such as ethanol, or the alkane liquids, such as pentane or hexane. In general, any liquid having a boiling point at least about 20° C. below the melting point of the polymer may be used. Preferably, water is used as the expansion agent.

(d) The expansion agent is adsorbed at the surface of an inorganic filler preferably made up wholly or for the most part of fumed silica. This filler is called an adsorption agent.

(e) Nucleation of the bubbles is brought about by the addition of a solid inorganic or organic filler having a particle size adapted to this function. A mixture of several inorganic or organic fillers may be used, either of the inert type or capable of generating gaseous by-products by thermal decomposition. This filler or mixture of fillers is called a nucleating agent. Another endothermic or exothermic expansion agent of the "chemical" type may also be used for this purpose in combination with one or more inert-type inorganic or organic fillers. Along these lines, commercially available products containing activated azodicarbonamide, allowing a high reaction rate during passage through the extruder, make it possible to improve the quality of the cellular structure.

(f) The polymer, the expansion agent, the adsorption agent, and the nucleating agent are mixed in a device ensuring sufficient homogenization before being placed in the extruder. The mixing operation is carried out at atmospheric pressure and ambient temperature. It may take place in any of the conventional mixers suitable for mixing powders, e.g., screw-type mixers or, more simply, rotary drums. The resulting product is called the mixture.

(g) All the ingredients necessary for obtaining the end product are included in the mixture before it is placed in the extruder.

(h) The mixture has a flow capacity equivalent to that of a dry powder or to that of a mixture of dry powders and pellets. Hence the mixture may be used directly for feeding the extruder.

(i) The process preferably calls for a single-screw extruder having a "length of screw to inside diameter of barrel" ratio between 20 and 50, preferably 30.

(j) The extruder is preferably provided with a spirally grooved barrel ensuring an output proportional to the speed of rotation of the screw virtually independently of the pressure in the extrusion head.

(k) The design of the screw is preferably such that the pressure in the first section of the screw (feeding zone) is greater that the pressures measurable downstream from that section.

(l) The extrusion screw is preferably provided with a barrier zone.

(m) The extrusion screw is preferably provided over the last part of its length with a distributive-type mixing element.

(n) The temperatures of the various zones of the extruder are preferably regulated in such a way that the temperature of the mixture entering the extrusion head is not more than 15° C. above the melting point of the polymer mixture.

(o) The extrusion head enables distribution of the mass of molten polymer about a central element, e.g., a tube, if necessary.

(p) Formation of the cellular structure is produced in a die or just after leaving a die forming part of the extrusion head.

(q) The extrusion head allows the co-extrusion of an outer layer of polymer without cellular structure, if necessary.

EXAMPLE

An example of a mixture answering the characteristics of the invention is described below, as is the process utilizing this mixture.

The mixture is composed of 60 parts of HDPE (high-density polyethylene) characterized by an MFI (melt-flow index) (190/2.16)<0.1 g/10 min. and of 40 parts of HDPE characterized by an MFI (190/2.16)>10 g/10 min. The two polymers are in the form of a powder of medium particle size <1 mm in diameter. The melting point of the polymers is between 128 and 131° C. (measurement by DSC—differential scanning calorimetry—at 8 K/min.). Added to this polymer mixture is 2% by weight of hydrophilic fumed silica characterized by a BET specific surface, measured according to DIN 66131, $\geq 200$ m$^2$/g, and acting as an adsorption agent. The nucleating agent is made up of two compounds. The first: 2% by weight of talc, characterized by a BET specific surface $\geq 10$ m$^2$/g. The second: 0.5% by weight of a chemical compound capable of releasing nitrogen by thermal decomposition, characterized by reaction kinetics which may be described as being of order 1 with an activation energy of 93 kJ/mole and a pre-exponential factor In $K_0$ of 22.4.

The various powders described above are thoroughly mixed in apparatus suitable for mixing powders. In the course of this operation, the expansion agent is added, consisting in this example of 2.5% by weight of water, and the operation continues until a mixture of powders is obtained which appears dry and capable of flowing regularly without forming any aggregate.

The mixture is transferred to the feeding system of the extruder, which produces the melting of the polymer, its homogenization, and its pressurizing in order to feed the extrusion head. The extruder used in this case is a single-screw extruder characterized by a specific output $\geq 1$ kg/h per screw revolution and an UD ratio=30. Reference is made to items (j) to (m) above relating to the extruder. The pressure upon entering the extrusion head is about 150 bar. The temperatures of the various zones of the extruder are regulated as follows: 40° C. –150° C. –150° C. –135° C. –135° C. The extrusion head is kept at 145° C., and the die at 135° C. Under these conditions, the temperature of the extruded mass is 140° C.

The shaping die forms part of an extrusion head connected to the extruder and equipped with a distributor whereby a layer of molten polymer is distributed about a tube made of synthetic material. The outside diameter of the tube is 8.0 mm, and the inside diameter of the die is 20.8 mm. Expansion of the polymer takes place at the outlet of the die. The outside diameter of the product thus produced is $\geq 85$ mm, and its apparent density is less than 40 kg/m$^3$. The product obtained comprises approximately 95% by volume of closed cells. The rigidity of the product thus extruded enables it to resist high mechanical stress as compared with conventional foam insulation.

In another test, with the same mixture and according to the same process as described above but with a die capable of generating the formation of the cellular structure inside the die, a product was obtained having an outside diameter of 65 mm for an apparent density of less than 40 kg/m$^3$ and about 95% by volume of closed cells.

Owing to its high rate of expansion, and consequently its low thermal conductivity, the product thus obtained is particularly suitable for thermally insulating the pipes of a hot-water or district-heating network.

What is claimed is:

1. A mixture for manufacturing an expanded cellular product including more than 90% by volume of closed cells, comprising:

a polymer or a mixture of polymers of the polyolefin group, in the form of powder or fine granules, a liquid expansion agent, an adsorption agent capable of adsorbing the liquid expansion agent and a nucleating agent;

wherein the adsorbing agent is a hydrophilic fumed silica; and wherein the mixture is the result of a mixing operation wherein said polymer or mixture of polymers, said expansion agent and said nucleating agent are mixed at ambient temperature and ambient pressure so that the mixture has a flow capacity equivalent to a dry powder so that the mixture can be readily fed into an extruder without any tendency to agglomerate.

2. A mixture according to claim 1, characterized in that the adsorbing agent is hydrophilic fumed silica having a high BET specific surface, preferably around 200 m2/g.

3. A mixture according to claim 2, characterized in that the hydrophilic fumed silica is added to the mixture in a quantity of 1% to 5% by weight, preferably 2% by weight.

4. A mixture according to claim 1, characterized in that the expansion agent is a low-boiling-point liquid or a mixture of low-boiling-point liquids.

5. A mixture according to claim 1, characterized in that the expansion agent is water in a quantity of 1% to 5% by weight, preferably 2,5% by weight, in the mixture.

6. A mixture according to claim 1, characterized in that the nucleating agent is an inorganic or organic compound or a mixture of said compounds.

7. A mixture according to claim 6, characterized in that the nucleating agent is made up of a combination of talc, in a quantity of 1% to 5% by weight, preferably 2% by weight, in the mixture.

8. A mixture according to claim 1, characterized in that it is completely produced before being introduced into the extruder.

9. A process for manufacturing an expanded cellular polymer product, characterized in that it comprises the following steps:

producing a mixture according to claim 1, introducing the mixture into an extruder, and extruding said mixture.

10. A process according to claim 9, wherein the extruder is of the single-screw type, the "length of screw to inside diameter of barrel" ratio being between 20 and 50, preferably 30.

11. A process according to claim 9, wherein the extruder comprises a spirally grooved barrel ensuring an output proportional to the speed of rotation of the screw independently of the pressure in the extrusion head.

12. A process according to claim 9, wherein the extruder comprises a screw equipped with a barrier zone.

13. A process according to claim 9, wherein the extruder comprises a screw capable of ensuring that the pressure of the mixture in the feeding zone is greater than the pressures of the mixture downstream from said zone.

14. A process according to claim 9, wherein the extruder comprises a screw provided with a distributive-type mixing element over the last portion of its length.

15. A process according to claim 9, wherein the extruder comprises temperature-regulating means capable of ensuring that the temperature of the mixture at the entrance to the extrusion head is not more than 15° C. above the melting point of the polymer.

16. A process according to claim 9, wherein the extruder comprises an extrusion head capable of distributing the mixture about a central element.

17. A process according to claim 9, wherein the extruder comprises an extrusion head equipped with a die capable of generating the expansion of the mixture within the die.

18. A process according to claim 9, wherein the extruder comprises an extrusion head equipped with a die capable of generating the expansion of the mixture at the outlet of the die.

19. A process according to claim 9, wherein the extruder comprises an extrusion head capable of allowing the simultaneous extrusion of an outer layer of a non-expanded product superimposed on the expanded layer.

* * * * *